US008604133B2

(12) United States Patent
Takagi et al.

(10) Patent No.: US 8,604,133 B2
(45) Date of Patent: Dec. 10, 2013

(54) GRAFT COPOLYMER AND PROCESS FOR PRODUCING THE SAME

(75) Inventors: Shigeharu Takagi, Nishikamo-gun (JP); Mitsuru Higa, Ube (JP)

(73) Assignees: Toyota Jidosha Kabushiki Kaisha, Toyota (JP); Yamaguchi University, Yamaguchi-Shi (JP)

( * ) Notice: Subject to any disclaimer, the term of this patent is extended or adjusted under 35 U.S.C. 154(b) by 1551 days.

(21) Appl. No.: 11/884,309

(22) PCT Filed: Feb. 14, 2006

(86) PCT No.: PCT/JP2006/302910
§ 371 (c)(1),
(2), (4) Date: Aug. 14, 2007

(87) PCT Pub. No.: WO2006/085695
PCT Pub. Date: Aug. 17, 2006

(65) Prior Publication Data
US 2010/0173223 A1 Jul. 8, 2010

(30) Foreign Application Priority Data

Feb. 14, 2005 (JP) ................................ 2005-036279

(51) Int. Cl.
*C08F 259/02* (2006.01)
*B01J 39/20* (2006.01)
*H01M 8/10* (2006.01)
*H01M 6/18* (2006.01)

(52) U.S. Cl.
USPC ........... 525/245; 525/244; 525/247; 525/195; 429/492; 429/309

(58) Field of Classification Search
USPC ........... 525/244, 245, 247, 195; 429/492, 309
See application file for complete search history.

(56) References Cited

U.S. PATENT DOCUMENTS

2003/0222048 A1* 12/2003 Asakawa et al. .................. 216/2
2003/0232939 A1* 12/2003 Charmot et al. ........... 526/218.1
2004/0127634 A1* 7/2004 Parker et al. ................... 524/571

FOREIGN PATENT DOCUMENTS

| EP | 1 541 550 A1 | 6/2005 |
|---|---|---|
| JP | A-2000-302823 | 10/2000 |
| JP | A-2000-514479 | 10/2000 |
| JP | A-2001-278933 | 10/2001 |
| JP | A-2004-018556 | 1/2004 |
| JP | A-2004-509192 | 3/2004 |
| JP | 2004-161873 | * 6/2004 |
| JP | A-2004-161873 | 6/2004 |
| JP | A-2004-518773 | 6/2004 |
| JP | A-2004-323693 | 11/2004 |

OTHER PUBLICATIONS

Davis et al. Adv. Polym. Sci. 2002, 159, 1-168.*

(Continued)

*Primary Examiner* — Mark Kaucher
(74) *Attorney, Agent, or Firm* — Oliff & Berridge, PLC.

(57) ABSTRACT

A graft copolymer having a side chain graft-polymerized by atom transfer living radical polymerization (ATRP) on a main chain polymerized by organotellurium-mediated living radical polymerization (TERP), wherein the molecular weight distribution is such that Mw/Mn is 1.5 or less. The graft copolymer is also such that a main chain moiety mainly consisting of the main chain and a side chain moiety mainly consisting of the side chain have microphase-separated structures. The graft copolymer has a narrow molecular weight distribution and forms microphase-separated structures through self organization of hydrophobic and hydrophilic moieties.

10 Claims, 5 Drawing Sheets

(56) References Cited

OTHER PUBLICATIONS

Larson et. al. Acta Chem. Scand. 1967, 21, 2571-2572.*
Matyjaszewski et al., "Atom Transfer Radical Polymerization," *Chem. Rev.*, Feb. 15, 2001, vol. 101, pp. 2921-2990.

Yamago et al., "Organtellurium Compounds as Novel Initiators for Controlled/Living Radical Polymerizations. Synthesis of Functionalized Polystyrenes and End-Group Modifications," *Journal of American Chemical Society Communications*, Feb. 27, 2002, vol. 124, No. 12, pp. 2874-2875.

* cited by examiner

GRAFT COPOLYMER AND PROCESS FOR PRODUCING THE SAME

This is a national filing under 35 U.S.C. §371 of PCT/JP2006/302910, filed Feb. 14, 2006.

TECHNICAL FIELD

The present invention relates to a graft copolymer, and a process for producing the same, which has a narrow molecular weight distribution and which forms microphase-separated structures through self organization of a hydrophobic moiety and a hydrophilic moiety.

Recently, attention is being focused on living radical polymerization processes. In such processes, polymers having a sharp molecular weight distribution can be obtained, and block and graft polymerization can also be easily conducted. For these reasons, applications for functional polymers are being investigated. For instance, JP Patent Publication (Kokai) No. 2004-161873, which is directed to providing a multi-branched polymer usable as a base polymer of a solid electrolyte free from liquid components which has high ionic conductivity and excellent mechanical strength, describes a multibranched polymer having a main chain and multiply branched side chains graft-polymerized with the main chain, wherein the main chain is composed of hard segments comprising any one of a copolymer of monomers having glass transition temperatures of 60° C. or higher, a copolymer of a monomer having a glass transition temperature of 60° C. or higher with a crystalline monomer, and a copolymer of crystalline monomers, and the side chains are composed of soft segments prepared by graft-polymerizing or graft-copolymerizing a monomer having a glass transition temperature of −20° C. or lower with the main chain. The production process is described as a graft copolymer production process wherein the main chain is synthesized by radical copolymerization and the side chains are synthesized by atom transfer radical polymerization (ATRP).

In a graft copolymer production process such as that described in JP Patent Publication (Kokai) No. 2004-161873, wherein the main chain is synthesized by radical copolymerization and side chains are then synthesized by ATRP, the main chain undergoes radical copolymerization using a common initiator such as AIBN, whereby a macroinitiator having a broad molecular weight distribution is synthesized. If the molecular weight distribution is broad, the resultant product is less like a biomembrane, and cannot act as a functional film that mimics living tissue.

On the other hand, while it is also possible to synthesize both the main chain and the side chains by ATRP, the chloromethylstyrene employed as the monomer itself acts as an initiator for ATRP, which makes it impossible to synthesize a macroinitiator for ATRP with ATRP using chloromethylstyrene. Further, even if both the main chain and the side chains are synthesized by organotellurium-mediated living radical polymerization (TERP), for the same reason, the chloromethylstyrene employed as the monomer itself acts as an initiator for TERP, which makes it impossible to synthesize a macroinitiator for TERP with TERP using chloromethylstyrene. Moreover, in a process wherein the main chain is synthesized by ATRP and the side chains are synthesized by TERP, the monomers capable of being polymerized by ATRP are limited, which makes it impossible to synthesize a macroinitiator for TERP with ATRP. While it is theoretically possible to synthesize a graft polymer even by TERP→TERP, ATRP→TERP, because the initiator for TERP has low resistance to an oxygen atmosphere, once the macroinitiator for TERP is synthesized, purification, storage and usage are difficult, which generally causes costs to rise.

DISCLOSURE OF THE INVENTION

The present invention is directed to solving the problems that the molecular weight distribution of a macroinitiator high molecular weight polymer which acts as the main chain synthesized by the conventional art is broad, that the molecular structure cannot be precisely controlled, and that a macroinitiator (main chain moiety) for ATRP cannot be synthesized using ATRP. Specifically, it is an object of the present invention to provide a graft copolymer, and a process for producing the same, which narrows the molecular weight distribution of a graft copolymer and which forms microphase-separated structures through self organization of a hydrophobic moiety and a hydrophilic moiety.

The present inventors focused on the advantage that a macroinitiator for ATRP can provide a graft polymer easily and cheaply because it is very stable with respect to oxygen, humidity and the like, whereas an initiator for TERP has low resistance to an oxygen atmosphere, thereby arriving at the present invention.

Specifically, a first aspect of the present invention is a method for producing a graft copolymer having a narrow molecular weight distribution, which comprises a step of synthesizing a main chain which is a macroinitiator by polymerizing desired main chain constituent monomers by organotellurium-mediated living radical polymerization (TERP), and a step of graft-polymerizing desired side chain constituent monomers by atom transfer living radical polymerization (ATRP) with a predetermined site of the macroinitiator as an initiation site. By synthesizing a main chain which is a macroinitiator by TERP and graft-polymerizing a side chain by ATRP, microphase-separated structures controlled to have a narrow molecular weight distribution can be produced through self organization. The obtained graft copolymer can exhibit various functions by making the main chain moiety and the side chain moiety have different compatibilities.

Here, examples of microphase-separated structures include a lamellar structure, a sea-island structure, a cylinder structure, a network structure and the like. In the graft copolymer according to the present invention, the phase-separated structures are formed from one or more of these structures.

The present invention may also comprise, after the step for synthesizing a main chain which is a macroinitiator by TERP and the step of graft-polymerizing by ATRP, a step of heat treating the obtained graft copolymer for a predetermined duration or longer. By heat treating, the microphase separations can be made more uniform. The heat treatment is preferably conducted at 80° C. or more. The above-described various microphase-separated structures can be made more uniform at 80° C. by carrying out the heat treatment for 5 hours or longer.

The molecular weight distribution of the graft copolymer produced by the present invention is narrow. Mw/Mn can be, for example, 1.5 or less, and preferably, 1.2 or less. Just looking at the main chain of the graft copolymer, the Mw/Mn of the main chain can be 1.2 or less, and preferably, 1.1 or less. Thus, the fact that the graft copolymer has a narrow molecular weight distribution is a factor in microphase separation. Specifically, the produced graft copolymer can have a main chain moiety mainly consisting of the main chain and a side chain moiety mainly consisting of the side chain which are microphase-separated structures. Especially, in the present invention, the size of the microphase-separated structures of the main chain moiety and the side chain moiety can be in the order of nanometers.

To efficiently produce the microphase-separated structures, it is effective to make the main chain moiety and the side chain moiety have different compatibilities. An example of this is where the main chain constituent monomers are a hydrophobic monomer or a mixture of hydrophobic monomers, and the side chain constituent monomers are a hydrophilic monomer or a mixture of hydrophilic monomers. However, since there only needs to be a difference in compatibilities between the main chain and the side chain, the present invention also includes cases where the main chain constituent monomers are a hydrophilic monomer or a mixture of hydrophilic monomers and the side chain constituent monomers are a hydrophobic monomer or a mixture of hydrophobic monomers, or where the hydrophilic monomers are the same but there is a difference in compatibilities, or where the hydrophobic monomers are the same but there is a difference in compatibilities.

A specific preferable example is where the main chain constituent monomers comprise chloromethylstyrene (CMS) and the side chain constituent monomers comprise methyl methacrylate (MMA).

A second aspect of the present invention is a graft copolymer having a narrow molecular weight distribution, which comprises a side chain graft-polymerized by atom transfer living radical polymerization (ATRP) on a main chain polymerized by organotellurium-mediated living radical polymerization (TERP).

As described above, the molecular weight distribution of the graft copolymer according to the present invention can be narrow, for example Mw/Mn can be 1.5 or less, and preferably, 1.2 or less. However, the graft copolymer according to the present invention is not limited to having a Mw/Mn of 1.5 or less. The present invention includes cases where Mw/Mn is more than 1.5, for example graft copolymers having a Mw/Mn of 1.8 are also produced. Just looking at the main chain of the graft copolymer, the Mw/Mn of the main chain can be 1.2 or less, and preferably, 1.1 or less. Thus, because the graft copolymer has a narrow molecular weight distribution, it is possible for a main chain moiety mainly consisting of the main chain and a side chain moiety mainly consisting of the side chain to have microphase-separated structures. Especially, in the present invention, the size of the microphase-separated structures of the main chain moiety and the side chain moiety can be in the order of nanometers.

Regarding the weight ratio between the above-described main chain moiety and the side chain moiety, a broad range may be employed. Depending of the weight ratio, the microphase-separated structures will have a lamellar structure, a sea-island structure, a cylinder structure, a network structure or the like. The microphase-separated structures are formed from one or more of these structures. Specifically, the weight ratio between the main chain moiety and the side chain moiety may be 5:95 to 95:5.

As described above, after graft polymerization, a heat treatment can be performed for making the microphase-separated structures of the main chain moiety and the side chain moiety more uniform. The surface ratio of the microphase-separated structures can be, for example, made to be 80% or more. By carrying out the heat treatment for a sufficient duration, for example, 5 hours or longer at 80° C., 3 hours or longer at 100° C., and 1 hour or longer at 120° C., the surface ratio of the microphase-separated structures can be made to be 80% or more. Further, by carrying out the heat treatment for 5 hours or longer at 120° C., 3 hours or longer at 140° C., or 1 hour or longer at 160° C., a hydrophobic region network structure (this may also be referred to as a "network phase") can be obtained.

To efficiently produce the microphase-separated structures, it is effective to make the main chain moiety and the side chain moiety have different compatibilities. An example of this is where the main chain is a hydrophobic moiety formed by a hydrophobic monomer and the side chain is a hydrophilic moiety formed by a hydrophilic monomer.

The graft copolymer according to the present invention can exhibit the functions of the main chain and the side chain separately. For example, mechanical strength, dimensional stability, heat resistance and the like can be expressed by the main chain, and high ionic conductivity can be expressed by the side chain.

A third aspect of the present invention is a polyelectrolyte using a graft copolymer having a narrow molecular weight distribution. A first instance of such polyelectrolyte comprises a graft copolymer comprising a main chain polymerized by organotellurium-mediated living radical polymerization (TERP) and a side chain having an ion-exchange group graft-polymerized by atom transfer living radical polymerization (ATRP). This polyelectrolyte functions as an electrolyte as a result of the ion-exchange group, such as a proton exchange group, of the side chain.

A second instance of such polyelectrolyte comprises an electrolyte salt having a base material composed of a main chain polymerized by organotellurium-mediated living radical polymerization (TERP) and a graft copolymer graft-polymerized by atom transfer living radical polymerization (ATRP). Here, while the electrolyte salt is not limited, as is described below, a lithium salt is preferred in order to use in a lithium battery.

A fourth aspect of the present invention is directed to uses of a graft copolymer having a narrow molecular weight distribution. A first instance of such a use is as a polyelectrolyte membrane for a fuel cell comprising the above-described polyelectrolyte; a second instance is as a polyelectrolyte for a lithium battery comprising the above-described polyelectrolyte; and a third instance is as a separation membrane mimicking living tissue comprising the above-described graft copolymer.

By synthesizing the macroinitiator (main chain moiety) by TERP and the graft chain (side chain moiety) by ATRP, the main chain and side chain molecular weight distributions can both be narrowly controlled. As a result, a polymer can be produced which is microphase-separated in the order of nanometers through self organization. The resultant polymer can exhibit its various functions efficiently due to the main chain moiety and the side chain moiety being phase-separated.

The mutually-incompatible main chain moiety and side chain moiety form microphase-separated structures through self organization, whereby the functions possessed by the main chain moiety and the functions possessed by the side chain moiety can be efficiently exhibited. In addition, since the spread of the molecular weight distribution is small, a polymer molding or polymer membrane having a channel structure which mimics living tissue can be formed. Examples of major applications include as an electrolyte for a fuel cell, as an electrolyte for a lithium battery, separation membrane mimicking living tissue and the like.

BEST MODE FOR CARRYING OUT THE INVENTION

Figure 1:
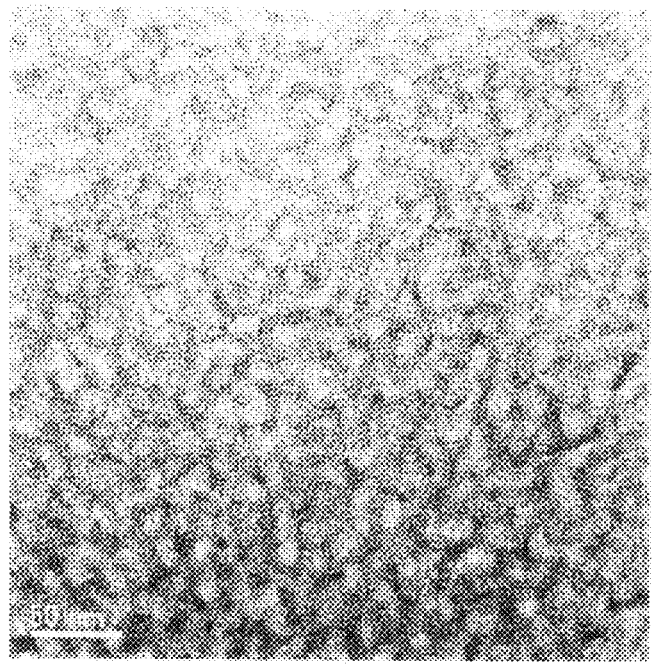
FIG. 1 is a TEM photograph of the graft copolymer obtained in Example 1.

The monomers, compounds, catalysts and the like used in the production of the graft copolymer according to the present invention will now be described.

An example of a first embodiment of the macroinitiator which serves as the main chain is a copolymer comprising a monomer (A) represented by the following chemical formula (I),

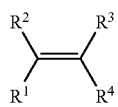

(I)

wherein $R^1$ to $R^4$ independently represent a hydrogen atom, a $C_{1-4}$ alkyl group, a hydroxyl group, a nitrile group, a halogen atom or a benzyl group, and a monomer (B) represented by the following chemical formula (II),

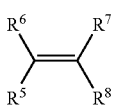

(II)

wherein $R^5$ to $R^7$ independently represent a hydrogen atom, a $C_{1-4}$ alkyl group, a hydroxyl group, a nitrile group, a halogen atom or a benzyl group; and $R^8$ represents a $C_{1-4}$ α-haloalkyl group or an iniferter group.

Examples of a $C_{1-4}$ alkyl group include a methyl group, an ethyl group, a propyl group, an isopropyl group, a butyl group, an isobutyl group, an s-butyl group, a t-butyl group and the like. Examples of a halogen atom include a fluorine atom, a chlorine atom, a bromine atom, an iodine atom and the like. Examples of a $C_{1-4}$ α-haloalkyl group include a fluoromethyl group, a chloromethyl group, a bromomethyl group, an iodomethyl group, a 1-chloroethyl group, a 1-chloropropyl group, a 1-chloro-1-methylethyl group, a 1-chlorobutyl group, a 1-chloro-1-methylpropyl group and the like. Examples of a $C_{1-4}$ acyl group include a formyl group, an acetyl group, a propionyl group, a butyryl group, an isobutyryl group and the like. In the formula, "n" denotes an integer of 1 to 20, and preferably, an integer of 2 to 15.

An example of a second embodiment of the macroinitiator which serves as the main chain is a linear polymer obtained by modifying a copolymer consisting of a monomer (A) represented by the following chemical formula (I),

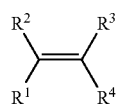

(I)

wherein $R^1$ to $R^4$ independently represent a hydrogen atom, a $C_{1-4}$ alkyl group, a hydroxyl group, a nitrile group, a halogen atom or a benzyl group, and a monomer (C) represented by the following chemical formula (III),

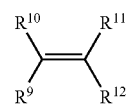

(III)

wherein $R^9$ to $R^{11}$ independently represent a hydrogen atom, a $C_{1-4}$ alkyl group, a hydroxyl group, a nitrile group, a halogen atom or a benzyl group; and $R^{12}$ represents an amino group, a carboxyl group, a hydroxyl group, an isocyanate group, a thiol group or a phosphate group, with a compound (D) represented by the following chemical formula (IV),

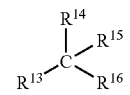

(IV)

wherein $R^{13}$ and $R^{14}$ independently represent a hydrogen atom, a $C_{1-4}$ alkyl group, a halogen atom or a benzyl group; $R^{15}$ corresponds to $R^{12}$ of monomer (C) and represents an amino group, a carboxyl group, a hydroxyl group, an isocyanate group, a thiol group or a phosphate group; and $R^{16}$ represents a $C_{1-4}$ α-haloalkyl group or an iniferter group.

In this embodiment, a linear polymer obtained by copolymerizing a mixture comprising the above-described monomer (A) and monomer (C) is modified with the compound (D). Using the resultant linear polymer as a macroinitiator, the $R^{16}$ functional group of the compound (D) in the polymer acts as a graft polymerization initiation site, so that the other monomers in the polymer undergo graft polymerization. In the first embodiment, a macroinitiator for graft polymerization undergoes a one-step reaction, or more specifically, the macroinitiator is obtained by copolymerization which synthesizes the main chain. In contrast, in the second embodiment, the macroinitiator is obtained by a two-step reaction wherein a copolymerization synthesizing the main chain is carried out, and then the main chain is modified with the compound (D) having an $R^{16}$ functional group which acts as the graft polymerization initiation site.

The present invention can employ either of these embodiments. It may be noted that modification with the compound (D) is carried out using the corresponding functional groups of the $R^{12}$ of compound (C) and the $R^{15}$ of compound (D), or more specifically, using any of an amino group, a carboxyl group, a hydroxyl group, an isocyanate group, a thiol group or a phosphate group.

In neither of the above-described embodiments is the monomer combination of the mixture which is to be copolymerized limited to a single combination. The combination may be such that a single kind of monomer is used for one of the monomers, while plural monomers are used for the other monomer, or that plural monomers are used for both monomers.

Specific examples of such monomers include a styrene group, methyl acrylate, methyl methacrylate, butyl methacrylate, vinyl chloride, acrylonitrile, butadiene, chloroprene, isoprene, vinylidene fluoride, vinyl alcohol, ethylene, propylene, ethylene terephthalate and the like.

Examples of monomers constituting a side chain of the graft copolymer according to the present invention include a monomer (E) represented by the following chemical formula (V),

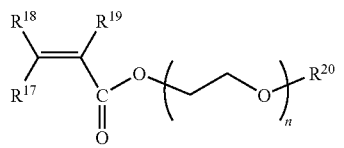

(V)

wherein $R^{17}$ to $R^{19}$ independently represent a hydrogen atom or a $C_{1-4}$ alkyl group; $R^{20}$ represents a hydrogen atom, a $C_{1-4}$ alkyl group or a $C_{1-4}$ acyl group; and "n" represents an integer of 1 to 20, and a monomer (F) represented by the following chemical formula (VI),

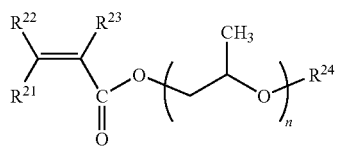

(VI)

wherein $R^{21}$ to $R^{23}$ independently represent a hydrogen atom or a $C_{1-4}$ alkyl group; $R^{24}$ represents a hydrogen atom, a $C_{1-4}$ alkyl group or a $C_{1-4}$ acyl group; and "n" represents an integer of 1 to 20, and a monomer (G) represented by the following chemical formula (VII),

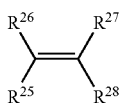

(VII)

wherein $R^{25}$ to $R^{27}$ independently represent a hydrogen atom, a $C_{1-4}$ alkyl group, a hydroxyl group, a nitrile group, a halogen atom or a benzyl group; and $R^{28}$ represents a benzene sulfone group, a carboxylic acid group or a phosphate group. These monomers may be used alone, or as a mixture of two or more thereof.

During production of the graft copolymer according to the present invention, in the step of synthesizing the main chain, which is a macroinitiator formed by polymerization of the desired main chain constituent monomers by organotellurium-mediated living radical polymerization (TERP), a mixture consisting of one or more monomers, at least one free radical source, and a mediator is polymerized.

Examples of the mediator may include the mediator (H) represented by the following chemical formula (VIII),

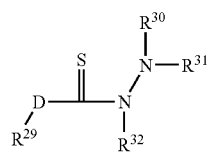

(VIII)

wherein $R^{29}$ is an arbitrary group that is releasable in free radical form in an addition-decomposition reaction; $R^{30}$ and $R^{31}$ are independently selected from the group consisting of hydrogen, hydrocarbyl, substituted hydrocarbyl, hydrocarbyl containing a heteroatom, hydrocarbyl containing a substituted heteroatom and a combination thereof; $R^{30}$ and $R^{31}$ may form a double bond with each other and may form a substituted alkenyl moiety; $R^{32}$ is selected from the group consisting of hydrogen, hydrocarbyl, substituted hydrocarbyl, hydrocarbyl containing a heteroatom, hydrocarbyl containing a substituted heteroatom and a combination thereof; $R^{32}$ may form a ring structure linked to $R^{30}$ and/or $R^{31}$, and such ring structure may have 3 to 50 non-hydrogen atoms; and D represents any of sulfur, selenium or tellurium.

During production of the graft copolymer according to the present invention, in the step of graft-polymerizing desired side chain constituent monomers by atom transfer radical polymerization (ATRP) with a predetermined site of the macroinitiator serving an initiation site, the side chain constituent monomers undergo graft polymerization to a macroinitiator comprising at least one radical transferable group by a catalyst comprising at least one species of transition metal halide positioned on a ligand.

Examples of the catalyst for ATRP include transition metal complexes represented by the following general formula.

MX(L)

In the formula, M represents a transition metal, X represents a halogen atom and (L) represents a ligand. Especially preferable is where, in the formula, M is a copper atom and X is a bromine atom or a chlorine atom, and where (L) is an organic compound having a lone electron pair selected from among 2,2'-bipyridyl, 2,2'-bi-4-heptylpyridyl, 2-(N-pentyl-iminomethyl)pyridine, sparteine, or tris(2-dimethylaminoethyl)amine. Preferable examples among these include a complex consisting of copper(I) chloride and a 2,2'-bipyridyl derivative or copper(I) bromide and a 2,2'-bipyridyl derivative.

EXAMPLES

The Examples and Comparative Examples of the present invention will now be described.

Example 1

(1) Styrene (St) and chloromethylstyrene (CMS) were used to form a mixture of ST/CMS=19.8/0.2 (mmol), and a macroinitiator (main chain moiety) was synthesized by TERP.

The synthesis conditions were as follows.

a) While charging a Schlenk flask with nitrogen gas, AIBN (0.2 mmol) was charged into the flask. The flask was then quickly sealed with a septum.

b) St (19.8 mmol), CMS (0.2 mmol) and an organotellurium initiator (0.2 mmol) were charged into the flask with a syringe.

c) The mixture was polymerized for 11 hours in a 60° C. oil bath while stirring with a magnetic stirrer.

d) The reaction solution was precipitated with methanol and then subjected to filtration with suction. The obtained polymer was then dried in a vacuum.

(2) With C1 of CMS as a starting point, a side chain moiety was synthesized by ATRP using methyl methacrylate (MMA). The synthesis conditions were as follows.

a) The macroinitiator (0.30 g) was dissolved in NMP (3.0 ml) while charging nitrogen gas into a Schlenk flask.

b) MMA (2.8 mmol) was added with a syringe. The reaction solution was frozen using liquid nitrogen. The contents of the Schlenk flask were purged using a vacuum pump to form a vacuum. The reaction solution was then allowed to dissolve at room temperature. This series of operations was repeated three times.

c) CuCl (0.028 mmol) and bpy (0.056 mmol) were added.

d) In the same manner as in b), the reaction solution was frozen, the contents of the Schlenk flask were purged using a vacuum pump to form a vacuum, and the reaction solution was then allowed to dissolve at room temperature. This series of operations was repeated three times.

e) The solution was polymerized for 20 hours in a 90° C. oil bath while stirring with a magnetic stirrer.

f) The reaction solution was precipitated with methanol and then subjected to filtration with suction. The obtained polymer was then dried in a vacuum.

(3) Measurement of the molecular weight distribution of the obtained high molecular weight polymer gave a Mn of 7,600 and a Mw/Mn of 1.2.

The molecular weight distribution measurement conditions were as follows.

0.010 g of the polymer was dissolved in 1 ml of THF. 10 μm of the resultant solution was injected using a syringe into a GPC system (column: Shodex KD-804; detector: JASCO RI-2031 Plus; flow rate: 0.8 ml/min; column temperature: 40.0° C.), and measurement was carried out.

(4) The composition of the obtained high molecular weight polymer was examined by NMR. The results showed that the St content was 66 mol % and the MMA content was 34 mol %.

The NMR analysis conditions were as follows.

0.010 g of the polymer was dissolved in 1 ml of $CDCl_3$. The $^1H$ NMR (JEOL No. INMG-1DS) was measured.

(5) The obtained high molecular weight polymer was dissolved in acetone by ultrasound. The resultant solution was dried, and then subjected to a heat treatment (100×3 hours).

(6) Staining was conducted using phosphotungstic acid. Observation by TEM confirmed the presence of microphase-separated structures (sea-sea structures) (see FIG. 1).

The staining and TEM observation conditions were as follows.

Staining conditions: Staining carried out by dipping in a solution consisting of 2% phosphotungstic acid, 2% benzyl alcohol and 96% water for 60 minutes.

TEM observation conditions: JEM2010 (manufactured by JEOL Ltd.), acceleration voltage of 200 kV.

Example 2

(1) MMA and CMS were used to form a mixture of MMA/CMS=19.8/0.2 (mmol), and a macroinitiator (main chain moiety) was synthesized by TERP.

The synthesis conditions were as follows.

a) While charging a Schlenk flask with nitrogen gas, AIBN (0.2 mmol) was charged into the flask. The flask was then quickly sealed with a septum.

b) MMA (19.8 mmol), CMS (0.2 mmol), dimethyl ditelluride (0.2 mmol) and an organotellurium initiator (0.2 mmol) were charged into the flask with a syringe.

c) The mixture was polymerized for 2 hours in a 60° C. oil bath while stirring with a magnetic stirrer.

d) The reaction solution was precipitated using hexane and then subjected to filtration with suction. The obtained polymer was then dried in a vacuum.

(2) With C1 of CMS as a starting point, a side chain moiety was synthesized by ATRP using St.

The synthesis conditions were as follows.

a) The macroinitiator (0.30 g) was dissolved in NMP (3.0 ml) while charging nitrogen gas into a Schlenk flask.

b) St (2.9 mmol) was added with a syringe. The reaction solution was frozen using liquid nitrogen. The contents of the Schlenk flask were purged using a vacuum pump to form a vacuum. The reaction solution was then allowed to dissolve at room temperature. This series of operations was repeated three times.

c) CuCl (0.029 mmol) and bpy (0.056 mmol) were added.

d) In the same manner as in b), the reaction solution was frozen, the contents of the Schlenk flask were purged using a vacuum pump to form a vacuum, and the reaction solution was then allowed to dissolve at room temperature. This series of operations was repeated three times.

e) The solution was polymerized for 20 hours in a 90° C. oil bath while stirring with a magnetic stirrer.

f) The reaction solution was precipitated with methanol and then subjected to filtration with suction. The obtained polymer was then dried in a vacuum.

(3) Measurement of the molecular weight distribution of the obtained high molecular weight polymer gave a Mn of 7,400 and a Mw/Mn of 1.2.

The molecular weight distribution measurement conditions were the same as in Example 1.

(4) The composition of the obtained high molecular weight polymer was examined by NMR. The results showed that the MMA content was 71 mol % and the St content was 29 mol %.

The NMR analysis conditions were the same as in Example 1.

(5) The obtained high molecular weight polymer was dissolved in acetone by ultrasound. The resultant solution was dried, and then subjected to a heat treatment (100×3 hours).

Figure 2:
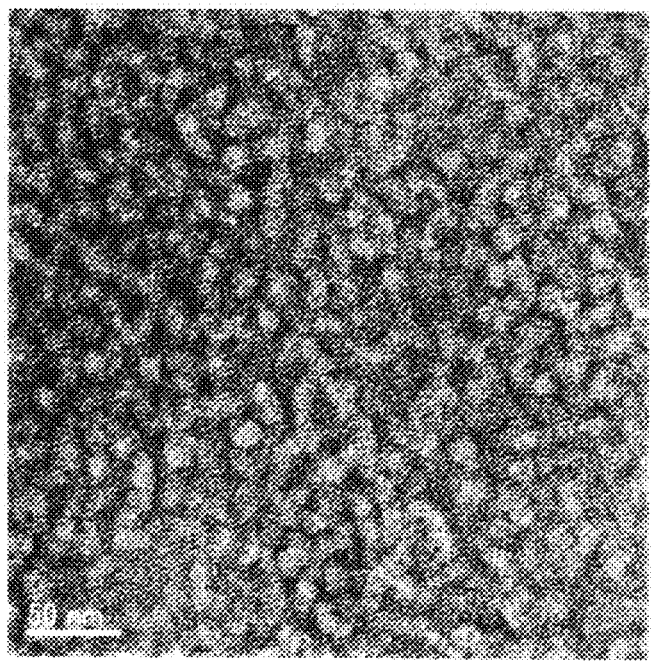
FIG. 2 is a TEM photograph of the graft copolymer obtained in Example 2.

(6) Staining was conducted using phosphotungstic acid. Observation by TEM confirmed the presence of microphase-separated structures (sea-sea structures) (see FIG. 2).

The staining and TEM observation conditions were the same as in Example 1.

Example 3

(1) St and CMS were used to form a mixture of ST/CMS=59.4/0.6 (mmol), and a macroinitiator (main chain moiety) was synthesized by TERP.

The synthesis conditions were as follows.

a) While charging a Schlenk flask with nitrogen gas, AIBN (0.2 mmol) was charged into the flask. The flask was then quickly sealed with a septum.

b) St (59.4 mmol), CMS (0.6 mmol) and an organotellurium initiator (0.2 mmol) were charged into the flask with a syringe.

c) The mixture was polymerized for 24 hours in a 60° C. oil bath while stirring with a magnetic stirrer.

d) The reaction solution was precipitated with methanol and then subjected to filtration with suction. The obtained polymer was then dried in a vacuum.

(2) With C1 of CMS as a starting point, a side chain moiety was synthesized by ATRP using MMA.

The synthesis conditions were as follows.

a) The macroinitiator (0.30 g) was dissolved in NMP (3.0 ml) while charging nitrogen gas into a Schlenk flask.

b) MMA (5.6 mmol) was added with a syringe. The reaction solution was frozen using liquid nitrogen. The contents of the Schlenk flask were purged using a vacuum pump to form a vacuum. The reaction solution was then allowed to dissolve at room temperature. This series of operations was repeated three times.

c) CuCl (0.028 mmol) and bpy (0.056 mmol) were added.

d) In the same manner as in b), the reaction solution was frozen, the contents of the Schlenk flask were purged using a vacuum pump to form a vacuum, and the reaction solution was then allowed to dissolve at room temperature. This series of operations was repeated three times.

e) The solution was polymerized for 20 hours in a 90° C. oil bath while stirring with a magnetic stirrer.

f) The reaction solution was precipitated with methanol and then subjected to filtration with suction. The obtained polymer was then dried in a vacuum.

(3) Measurement of the molecular weight distribution of the obtained high molecular weight polymer gave a Mn of 29,000 and a Mw/Mn of 1.4.

The molecular weight distribution measurement conditions were the same as in Example 1.

(4) The composition of the obtained high molecular weight polymer was examined by NMR. The results showed that the St content was 39 mol % and the MMA content was 61 mol %.

The NMR analysis conditions were the same as in Example 1.

(5) The obtained high molecular weight polymer was dissolved in acetone. The resultant solution was dried, and then subjected to a heat treatment (100×3 hours).

Figure 3:
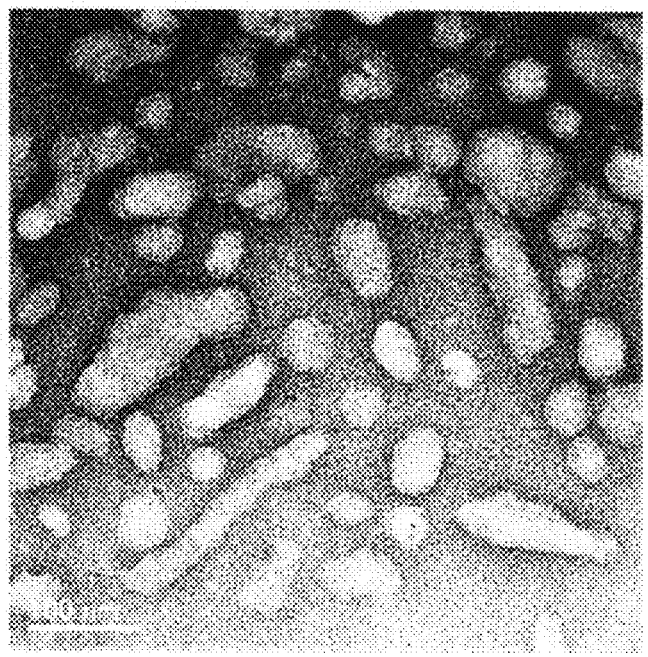
FIG. 3 is a TEM photograph of the graft copolymer obtained in Example 3.

(6) Staining was conducted using phosphotungstic acid. Observation by TEM confirmed the presence of microphase-separated structures (sea-island structures) (see FIG. 3). The surface ratio of the regions having a microphase-separated structure was no more than 20%.

The staining and TEM observation conditions were the same as in Example 1.

Example 4

(1) St and CMS were used to form a mixture of ST/CMS=59.4/0.6 (mmol), and a macroinitiator (main chain moiety) was synthesized by TERP.

(2) With C1 of CMS as a starting point, a side chain moiety was synthesized by ATRP using MMA.

(3) Measurement of the molecular weight distribution of the obtained high molecular weight polymer gave a Mn of 29,000 and a Mw/Mn of 1.4.

(4) The composition of the obtained high molecular weight polymer was examined by NMR. The results showed that the St content was 39 mol % and the MMA content was 61 mol %. (Items (1) to (4) were the same as in Example 3)

(5) The obtained high molecular weight polymer was dissolved in acetone. The resultant solution was dried, and then subjected to a heat treatment (100×5 hours).

Figure 4:
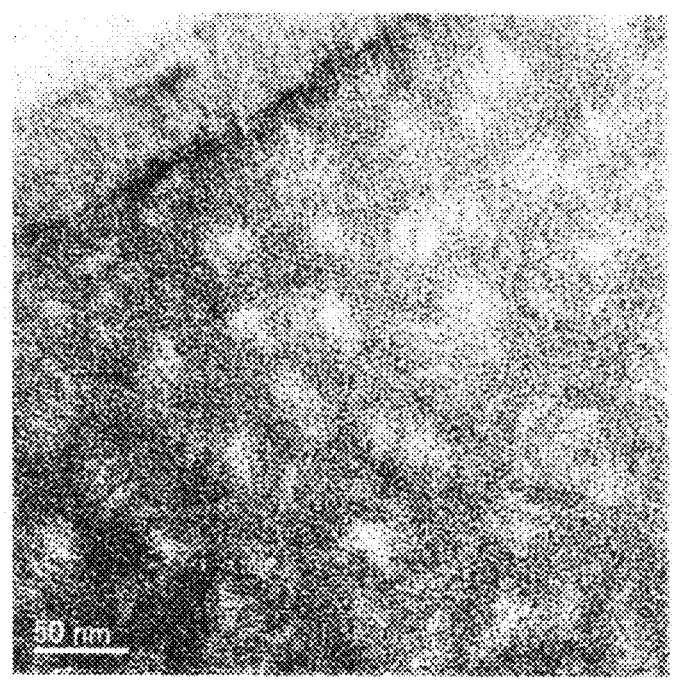
FIG. 4 is a TEM photograph of the graft copolymer obtained in Example 4.

(6) Staining was conducted using phosphotungstic acid. Observation by TEM confirmed the presence of microphase-separated structures (lamellar structures) (see FIG. 4). Further, the surface ratio of the regions having a microphase-separated structure was 80% or more. That is, it was confirmed that the microphase-separated structures were formed more evenly.

The staining and TEM observation conditions were the same as in Example 1.

Comparative Example 1

(1) MMA and CMS were used to form a mixture of MMA/CMS=39.6/0.4 (mmol), and a macroinitiator (main chain moiety) was synthesized by radical copolymerization.

The synthesis conditions were as follows.

a) A mixture consisting of 39.6 mmol of MMA and 0.4 mmol of CMS was dissolved in toluene.

b) The solution was charged with AIBN. The resultant solution was bubbled with argon, and then sealed. The solution was then made to react by heating, under stirring, at 80° C. for 30 minutes.

c) The reaction solution was allowed to cool to room temperature, and was then charged into methanol while stirring to thereby obtain a precipitate.

d) The supernatant was removed, and the precipitate was dissolved in toluene.

e) The solution was charged into methanol while stirring. The supernatant was removed, and the resulting residue was dried to thereby obtain a macroinitiator.

(2) A side chain moiety was synthesized by ATRP using St. The synthesis conditions were the same as in Example 2.

(3) The molecular weight distribution of the obtained high molecular weight polymer was measured.

Measurement of the molecular weight distribution of the obtained high molecular weight polymer gave a Mn of 31,000 and a Mw/Mn of 2.4.

The molecular weight distribution measurement conditions were the same as in Example 1.

In the above examples, examinations were carried out on several various compositions, whereby it was confirmed that the microphase-separated structures also varied. Specifically, it was confirmed that the microphase-separated structures can be precisely controlled by the composition.

Further, it was confirmed that the molecular weight distribution of the polymer obtained in Comparative Example 1 (Mw/Mn of 2.4), wherein a macroinitiator serving as the main chain was synthesized using St and CMS by normal radical polymerization, and wherein the obtained polymer was synthesized having a side chain moiety using MMA by ATRP, was broader than the molecular weight distribution of Example 2 (Mw/Mn of 1.2).

Example 5

A sample obtained from Example 2 wherein MMA/CMS=99/1 and having a St content of 39 mol % (MMA/CMS 61 mol %) was used. The sample was dissolved in acetone as a solvent by ultrasound (20 min), and the resultant solution was then heated under various heat treatment conditions by placing a microgrid over a hotplate. The heat treatment conditions were carried out as 80° C.×3 h, 100° C.×3 h, 120° C.×3 h, 140° C.×3 h and 100° C.×5 h. Staining was subsequently conducted using phosphotungstic acid (aqueous solution of 2% phosphotungstic acid (PTA) and 2% benzyl alcohol for 1 h). Observation was carried out by TEM (JEM-2010 (manufactured by JEOL Ltd.) at an acceleration voltage of 200 kV).

Figure 5:
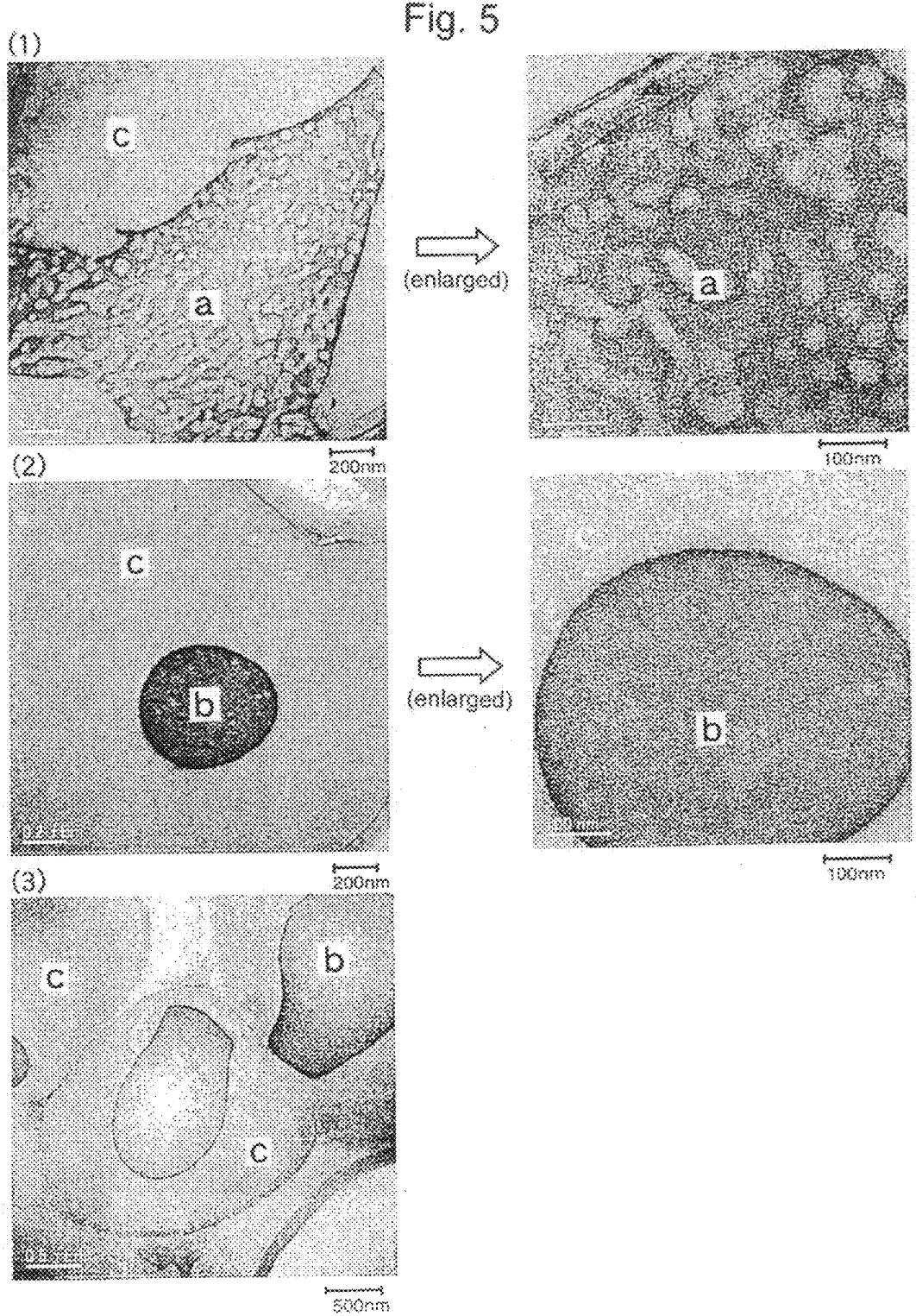
FIG. 5 is a series of TEM photographs of the graft copolymer obtained in Example 5 under heat treatment conditions of 80° C.×3 hours.

FIG. 5 is a series of TEM photographs of the graft copolymer obtained in Example 5 under heat treatment conditions of 80° C.×3 hours. (1) to (3) are TEM photographs showing the respective portions and enlargements thereof distinguishing the phase-separated structures of the present invention. In FIG. 5, "portion a" indicates a network structure or a sea-island structure (black: MMA, white: St), "portion b" indicates an MMA-rich phase (black: MMA, white: St), and "portion c" indicates a St-rich phase (black: MMA, white: St). In FIG. 5, the surface ratio is such that "portion a"+"portion b":"portion c"=10 to 20:80 to 90.

Figure 6:
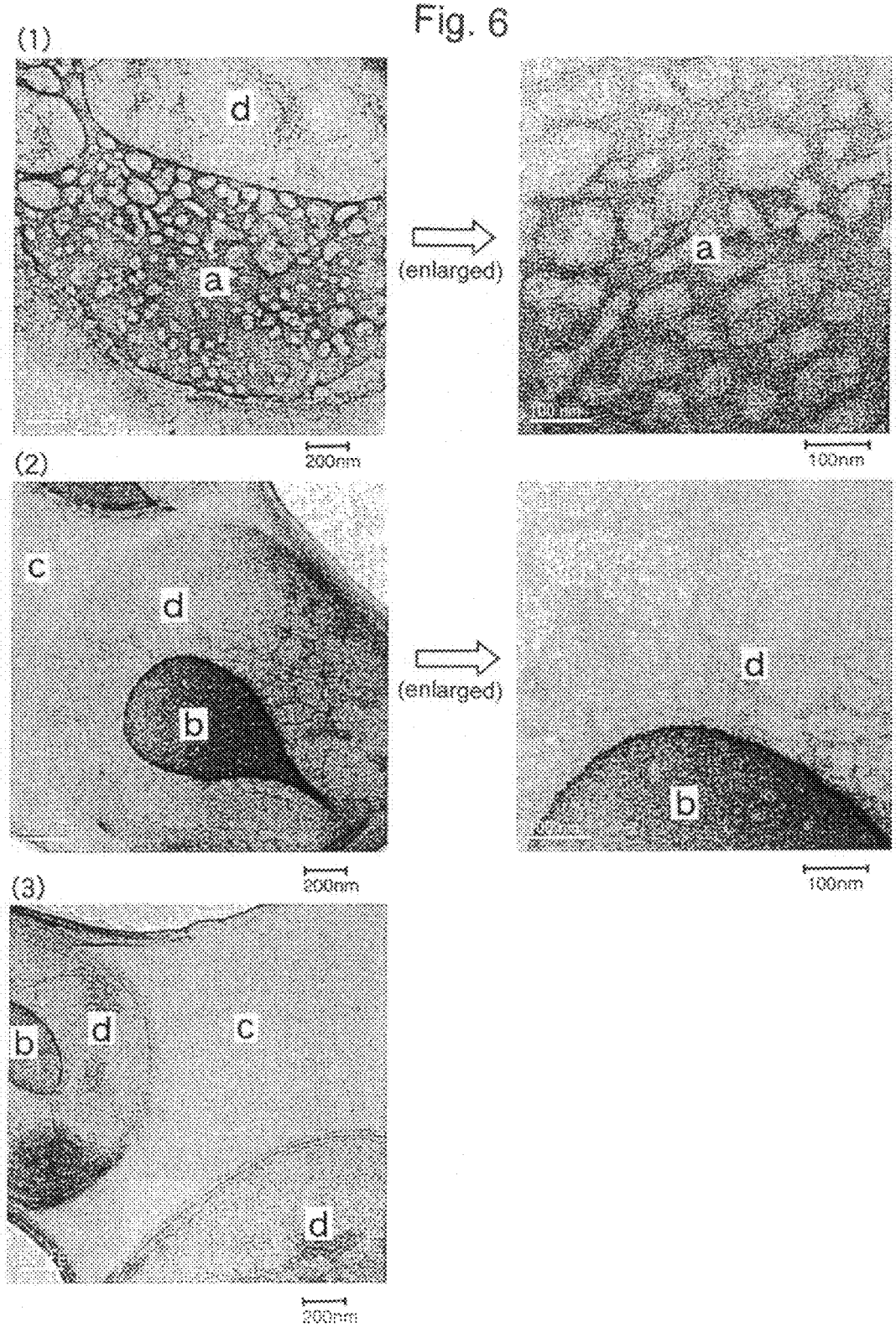
FIG. 6 is a series of TEM photographs of the graft copolymer obtained in Example 5 under heat treatment conditions of 140° C.×3 hours.

FIG. 6 is a series of TEM photographs of the graft copolymer obtained in Example 5 under heat treatment conditions of 140° C.×3 hours. (1) to (3) are TEM photographs showing the respective portions and enlargements thereof distinguishing the phase-separated structures of the present invention. In FIG. 6, "portion a" indicates a high MMA content network structure or sea-island structure (black: MMA, white: St), "portion b" indicates an MMA-rich phase (black: MMA, white: St), "portion c" indicates a St-rich phase (black: MMA, white: St) and portion d indicates a high St content network structure or sea-island structure (black: MMA, white: St). In FIG. 6, the surface ratio is such that "portion a"+"portion b":"portion c"+"portion d"=10 to 20:80 to 90.

Figure 7:
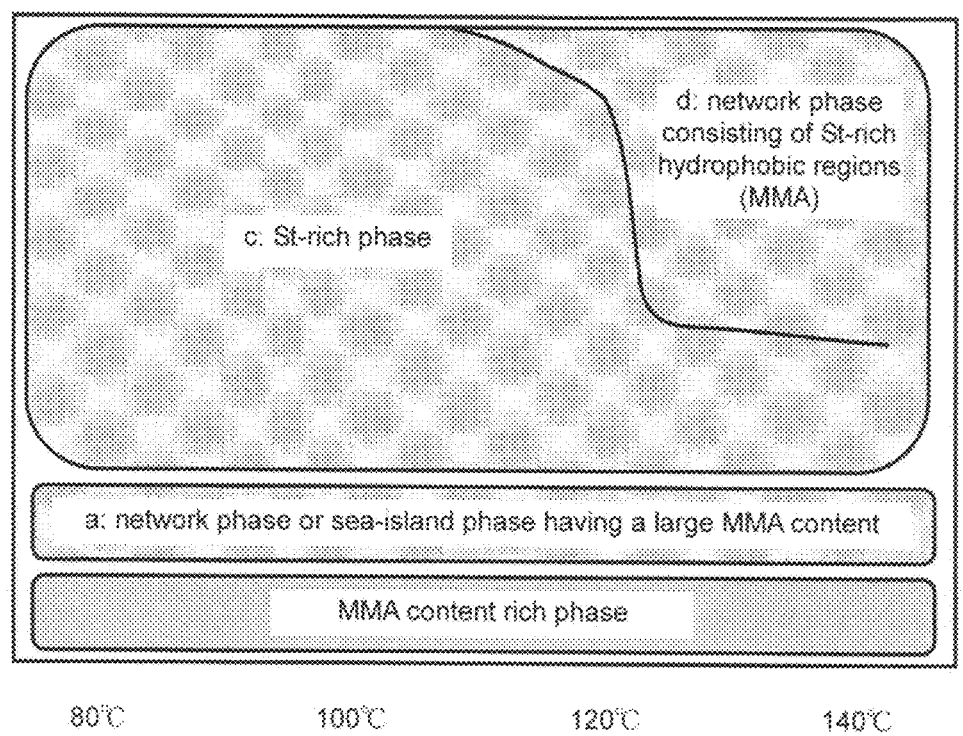
FIG. 7 is a composition diagram showing the approximate surface ratio for the respective phases as determined from the TEM photographs of the graft copolymers obtained in Example 5 under the respective heat treatment conditions.

Microphase-separated structures were confirmed under all of the heat treatment conditions of Example 5, and putting all of these results together forms a diagram like FIG. 7. FIG. 7 is a composition diagram showing the approximate surface ratio for each phase (vertical axis) as determined from the TEM photographs of the graft copolymers obtained in Example 5 under the respective heat treatment conditions.

Although microphase-separated structures were confirmed under all of the heat treatment conditions by the results shown in FIGS. 5 to 7, it can especially be seen that a hydrophobic region MMA network structure is formed even in the St-rich phase of "portion d" with the heat treatments of 120° C. or higher. It is noted that while the sample of the present invention was an MMA-rich composition, based on the changes in heat treatment conditions at around 120° C. of the St-rich phase, it can be seen that a hydrophobic region MMA network structure is formed even in the St-rich phase with a heat treatment of 120° C. or higher.

From Examples 1 to 5, it can be seen that by enabling the molecular weight distribution to be narrowly controlled, the hydrophilic and hydrophobic moieties can be efficiently separated (form microphase-separated structures). As a result, main chain durability and side chain proton conductivity can both be achieved, whereby applications as the electrolyte of fuel cells can be expected. For example, by adding a hydrophilic functional group to the St-rich phase to enable proton conductivity, and expressing the durability in the MMA network structure of the St-rich hydrophobic regions, a polyelectrolyte for a fuel cell can be produced which comprises both proton conductivity and durability at the same time.

INDUSTRIAL APPLICABILITY

The graft copolymer according to the present invention can narrowly control molecular weight distribution and can separate into microphases in the order of nanometers through self organization. By separating the phases of the main chain moiety and the side chain moiety, their respective functions can be efficiently exhibited. Applications include as a polyelectrolyte membrane for a fuel cell, as a polyelectrolyte for a lithium battery and as a separation membrane which mimics living tissue.

The invention claimed is:
1. A method for producing a graft copolymer comprising:
a step of synthesizing a main chain which is a macroinitiator by polymerizing desired main chain constituent monomers, which are a hydrophobic monomer or a mixture of hydrophobic monomers, by organotellurium-mediated living radical polymerization (TERP);
a step of graft-polymerizing desired side chain constituent monomers, which are a hydrophilic monomer or a mixture of hydrophilic monomers, by atom transfer living radical polymerization (ATRP) with a predetermined site of the macroinitiator as an initiation site; and
a step of heat treating the obtained graft copolymer for 1 to 5 hours at a temperature from 120° C. to 160° C., wherein:
in the produced graft polymer, a main chain moiety mainly consisting of the main chain and a side chain moiety mainly consisting of the side chain are microphase-separated structures; and
a surface ratio of the microphase-separated structures is 80% or more.

2. The method for producing a graft copolymer according to claim 1, wherein the molecular weight distribution Mw/Mn of the produced graft copolymer is 1.5 or less.

3. The method for producing a graft copolymer according to claim 1, wherein the molecular weight distribution Mw/Mn of the produced graft copolymer is 1.2 or less.

4. The method for producing a graft copolymer according to claim 1, wherein the macroinitiator is a copolymer consisting of styrene and chloromethylstyrene.

5. The method for producing a graft copolymer according to claim 1, wherein the macroinitiator is a linear polymer obtained by modifying a copolymer selected from the group consisting of a monomer (A) represented by the following chemical formula (I),

wherein any one of $R^1$ to $R^4$ is a nitrile group, and the remaining R groups independently represent a hydrogen atom, a $C_{1-4}$ alkyl group, a hydroxyl group, a nitrile group, a halogen atom or a benzyl group, and a monomer (C) represented by the following chemical formula (III),

wherein $R^9$ to $R^{11}$ independently represent a hydrogen atom, a $C_{1-4}$ alkyl group, a hydroxyl group, a nitrile group, a halogen atom or a benzyl group; and $R^{12}$ represents an amino group, a carboxyl group, a hydroxyl group, an isocyanate group, a thiol group or a phosphate group, with a compound (D) represented by the following chemical formula (IV),

wherein $R^{13}$ and $R^{14}$ independently represent a hydrogen atom, a $C_{1-4}$ alkyl group, a halogen atom or a benzyl group; $R^{15}$ corresponds to $R^{12}$ of monomer (C) and each $R^{15}$ represents an amino group, a carboxyl group, a hydroxyl group, an isocyanate group, a thiol group or a phosphate group; and $R^{16}$ represents a $C_{1-4}$ α-haloalkyl group or an iniferter group.

6. The method for producing a graft copolymer according to claim 1, wherein the side chain constituent monomers include a combination of two or more of the monomers selected from the group consisting of:

monomer (E) represented by the following chemical formula (V),

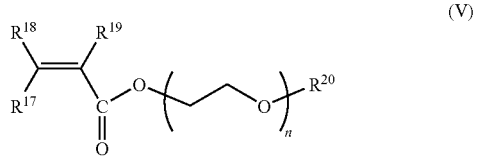

wherein $R^{17}$ to $R^{19}$ independently represent a hydrogen atom or a $C_{1-4}$ alkyl group; $R^{20}$ represents a hydrogen atom, a $C_{1-4}$ alkyl group or a $C_{1-4}$ acyl group; and "n" represents an integer 0 to 20;

monomer (F) represented by the following chemical formula (VI),

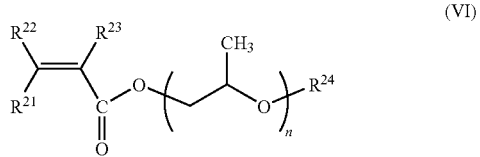

wherein $R^{21}$ to $R^{23}$ independently represent a hydrogen atom or a $C_{1-4}$ alkyl group; $R^{24}$ represents a hydrogen atom, a $C_{1-4}$ alkyl group or a $C_{1-4}$ acyl group; and "n" represents an integer of 1 to 20; and monomer (G) represented by the following chemical formula (VII),

wherein $R^{25}$ to $R^{27}$ independently represent a hydrogen atom, a $C_{1-4}$ alkyl group, a hydroxyl group, a nitrile group, a halogen atom or a benzyl group; and $R^{28}$ represents a benzene sulfone group, a carboxylic acid group or a phosphate group.

7. The method for producing a graft copolymer according to claim 1, wherein the main chain constituent monomers comprise chloromethylstyrene (CMS) and the side chain constituent monomers comprise methyl methacrylate (MMA).

8. The method for producing a graft copolymer according to claim 1, wherein in the step of synthesizing the main chain which is a macroinitiator by polymerization of desired main chain constituent monomers by organotellurium-mediated living radical polymerization (TERP), a mixture comprising one or more monomers, at least one free radical source, and a mediator are polymerized, the mediator being a mediator (H) represented by the following chemical formula (VIII),

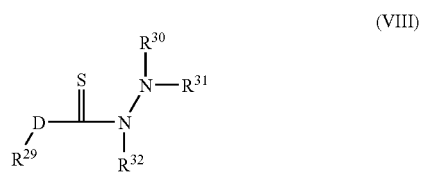

wherein $R^{29}$ is an arbitrary group that is releasable in free radical form in an addition-decomposition reaction; $R^{30}$ and $R^{31}$ are independently selected from the group consisting of hydrogen, hydrocarbyl, substituted hydrocarbyl, hydrocarbyl containing a heteroatom, hydrocarbyl containing a substituted heteroatom and a combination thereof; $R^{30}$ and $R^{31}$ may form a double bond with each other and may form a substituted alkenyl moiety; $R^{32}$ is selected from the group consisting of hydrogen, hydrocarbyl, substituted hydrocarbyl, hydrocarbyl containing a heteroatom, hydrocarbyl containing a substituted heteroatom and a combination thereof; $R^{32}$ may form a ring structure linked to $R^{30}$ and/or $R^{31}$, such ring structure having 3 to 50 non-hydrogen atoms; and D represents tellurium.

9. The method for producing a graft copolymer according to claim 1, wherein in the step of graft-polymerizing desired side chain constituent monomers by atom transfer radical polymerization (ATRP) with a predetermined site of the macroinitiator serving an initiation site, the side chain constituent monomers undergo graft polymerization to a macroinitiator comprising at least one radical transferable group by a catalyst comprising at least one species of transition metal halide positioned on a ligand.

10. The method for producing a graft copolymer according to claim 9, wherein the catalyst is a complex consisting of copper(I) chloride and a 2,2'-bipyridyl derivative or copper(I) bromide and a 2,2'-bipyridyl derivative.

* * * * *